Jan. 29, 1924.  
J. WIMP  
1,482,176  
CONVERTIBLE MATTRESS SUPPORT FOR AUTOMOBILE BEDS  
Filed June 5, 1922  
2 Sheets-Sheet 1
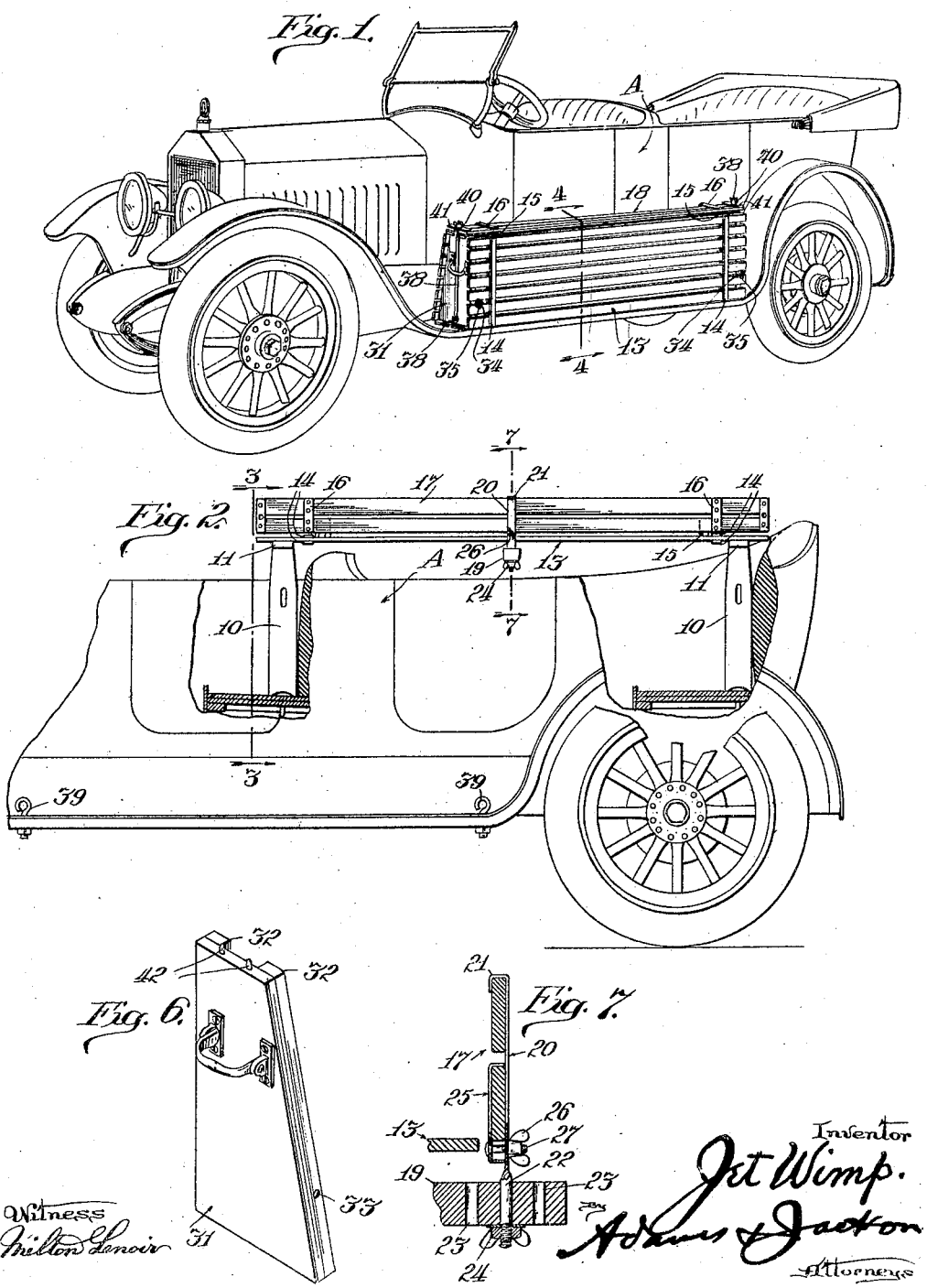

Jan. 29, 1924. 1,482,176
J. WIMP
CONVERTIBLE MATTRESS SUPPORT FOR AUTOMOBILE BEDS
Filed June 5, 1922  2 Sheets-Sheet 2
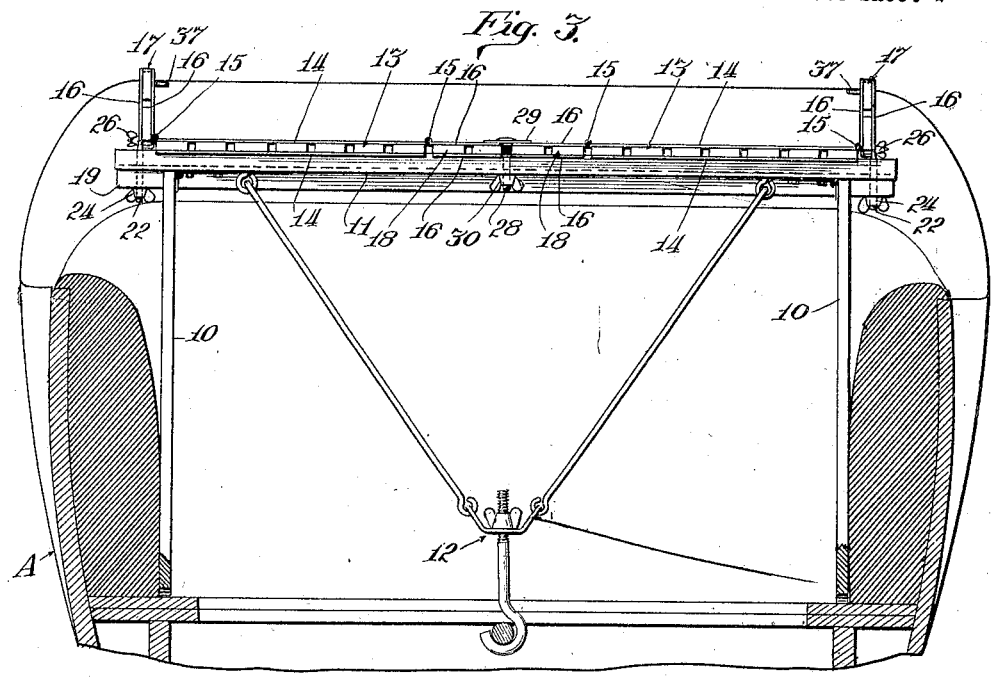
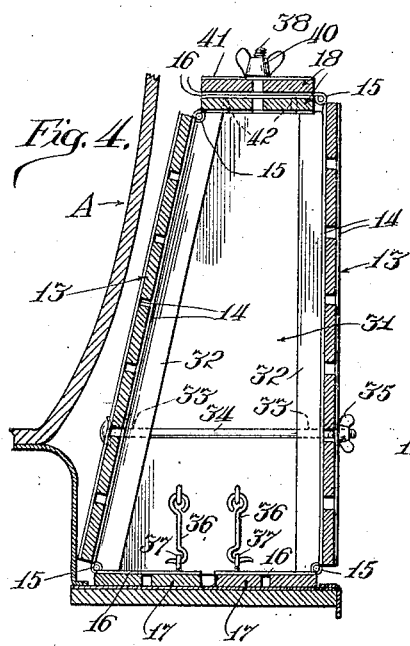
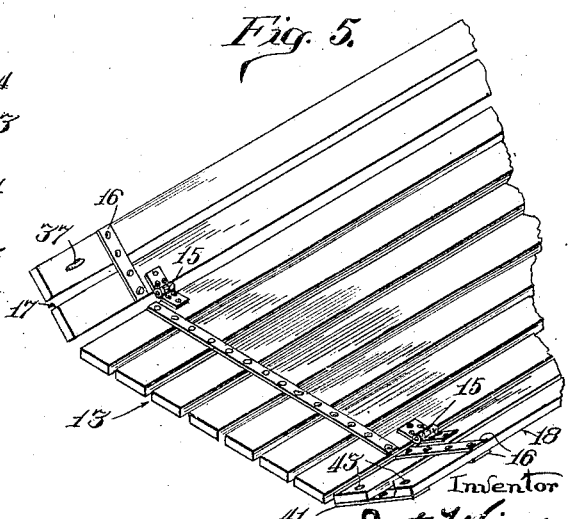

Patented Jan. 29, 1924.

1,482,176

UNITED STATES PATENT OFFICE.

JET WIMP, OF CHICAGO, ILLINOIS.

CONVERTIBLE MATTRESS SUPPORT FOR AUTOMOBILE BEDS.

Application filed June 5, 1922. Serial No. 566,171.

*To all whom it may concern:*

Be it known that I, JET WIMP, a citizen of the United States, and a resident of Chicago, in the county of Cook and State of Illinois, have invented certain new and useful Improvements in Convertible Mattress Supports for Automobile Beds, of which the following is a specification, reference being had to the accompanying drawings.

This invention relates to improvements in the mattress-supporting member of a bed that is adapted to be carried by and set up for use in automobiles, the bed structure as a whole being of the same general type as that shown and described in my pending application filed September 19, 1921, Serial No. 501,682, of which the present application is, in some respects, a division,—certain features also being presented herein that were not present in said former application. The leading object of this invention is to provide a novel mattress-supporting member adapted, when not in use as an element of a bed, to be folded upon itself in such manner as to form the top, bottom and sides of a receptacle that can rest upon a running-board of an automobile and have securely packed within it the other elements that constitute the complete bed structure, as well as other articles. Further objects of the invention are to provide means extending transversely of said mattress-supporting member and adjustably connected therewith at any point intermediate its ends so as to prevent undue sagging thereof under the weight of the occupant or occupants of the bed; to provide means for holding in an upturned position the side edge portions of such mattress-supporting member so that a mattress that is laid thereon will not be permitted to shift laterally and which upturned portions will also serve as rigid supports for the said means that are employed to prevent sagging; and to improve in various details of construction devices of this general character. I accomplish these objects by the construction and combinations of parts shown in the drawings and hereinafter particularly described. That which I believe to be new will be set forth in the claims.

In the drawings,—

Fig. 1 is a perspective view of an automobile with my improved mattress-supporting member converted into a receptacle and secured in place upon the running-board of the machine;

Fig. 2 is a side elevation of an automobile body, portions thereof being broken away, with a bed set up therein that comprises as one of its elements my improved mattress-supporting member;

Fig. 3 is an end view of the bed structure shown in Fig. 2, the body of the automobile being shown in vertical section;

Fig. 4 is a vertical section taken on the line 4—4 of Fig. 1;

Fig. 5 is a detail, showing one of the halves of the mattress-supporting member, an end portion thereof being broken away;

Fig. 6 is a detail, being a perspective view of one of the heads or ends that together with the mattress-supporting member constitute the receptacle that is shown in Fig. 1; and Fig. 7 is a detail, being a vertical section taken at line 7—7 of Fig. 2, and showing the means employed for holding one of the side portions of the mattress-supporting member in an upturned position and that also supports in place the cross-bar that extends laterally beneath such member.

Referring to the several figures of the drawings,—

A indicates the body of an ordinary automobile of a make having the usual front and rear seats. Upon the seat frames, after the usual seat cushions are removed, I support the bed structure which comprises two similar supporting frames formed by legs 10 and a cross-bar 11, the legs connected with each cross-bar being hinged thereto so as to be capable of being folded up against the cross-bar. Each supporting frame is held firmly connected with its seat frame by suitable tension means, such as shown in Fig. 3 and indicated generally by 12. A more detailed description of these frames and tensioning means is not here given as those matters are very fully described and form the subject-matter of my said pending application. Furthermore, such constructions may be very widely departed from so far as concerns the subject-matter of the present application.

The mattress-supporting member with which my present invention is more particularly concerned is, in the construction shown, formed of a series of parallel slats which are adapted to extend longitudinally of the automobile with the end portions of the slats resting upon the supporting frames referred to, or other suitable supports. This slatted mattress-supporting member is, as here shown, made in two similar sections, one of which is clearly shown in Fig. 5, and each section as a whole is indicated by 13. Each of the sections has the greater portion of its slats rigidly held together by cleats 14, two or more of which may be employed, and one of which is clearly shown in Fig. 5. One or more slats at each side of the rigidly-united slats are connected by hinges 15 to the rigidly-united slats, and where two sets of slats are hingedly connected in place at each side those two slats will be connected together by a cleat or cleats, as 16. These hinged wings that are thus formed are indicated, respectively, by 17 and 18. When the mattress-support as a whole is in position, as in Figs. 2 and 3, to receive and hold a mattress, one of the side wings of each mattress-supporting section will be turned up to stand in a substanitally vertical position to form side walls that will effectually prevent any lateral shifting of the mattress—the other side wings lying, of course, extended out in the same plane as that of the main rigidly-united portion.

The means for holding these hinged wings in their vertical position comprises a cross-bar 19 which extends transversely of the mattress-supporting member and substantially midway between the ends thereof, such cross-bar being located, as clearly shown in Fig. 7, at some little distance below the mattress-support. At each end of this cross-bar is a metal rod 20, which, for the greater portion of its length, is preferably flattened so as to lie snugly alongside of the outer face of the upturned wing, and at its upper end is provided with a hook 21 of a size and shape to engage over the upper edge of the upper one of the two slats that are shown as comprising the wing. The lower portion of this rod 20, in the construction shown, is cylindrical, as indicated at 22, such end lying within one of a plurality of holes 23 that are formed through the cross-bar. The lower end of the cylindrical portion 22 is screw-threaded as shown to adapt a nut 24 to be screwed thereon. To strengthen the upright rod 20 and to distribute the weight of the cross-bar 19 and any load that may be imposed thereon, as hereinafter explained, I provide a clamping member 25 in the form of a short metal strap that lies against the inner face of the lowermost upturned slat of the wing, which metal strap has its ends inwardly turned toward the rod 20, the upper inwardly-turned end resting upon the upper edge of said lowermost slat. The clamping member is adapted to be solidly clamped against such lowermost slat and to the rod 20 by means of a nut 26 and a bolt 27 that passes through the two members 25 and 20, as clearly shown in Fig. 7. I have called attention to the fact that the cross-bar 19 is at some little distance below the mattress-supporting member, and I so arrange it so that the slats of such member, except the upturned ones, may yield under the weight of the occupants of the bed, but to prevent undue yielding the cross-bar 19 will be so located as to have the slats come in contact with it when a very heavy person or persons occupy the bed and by such contact the breaking of the body of the mattress-supporting member will be prevented. By having the marginal slats upturned as shown a very rigid construction is provided from which to support the transverse cross-bar 19. As will be understood, this cross-bar can be vertically adjusted as may be required by a manipulation of the nuts 24.

Making the mattress-supporting member in two parts or sections, as described, is of advantage not only by reason of the fact that it can be handled easier than if it were all in one part, but it can be better adapted to different widths of automobiles so as to occupy all of the space from side to side thereof—this being possible because the two parts or sections can be separated from each other within reasonable limits without impairing its efficiency, even though a little greater space be left between the two parts or sections than is present between the several slats of each section. As shown in Fig. 3, the two parts or sections of the mattress-supporting member can be clamped at each of its ends to one of the cross-bars of the frame upon which it rests by a single clamping device, such device comprising a bolt 28 that passes through an opening in one of the frame cross-bars 11, the upper end of such bolt extending into a space between the inner slats of the mattress-supporting member. This space between the two sections is bridged by a plate 29 through which the bolt also passes and against the upper face of which the head of the bolt bears. On the lower screw-threaded end of such bolt is a wing nut 30, and it will be evident that by screwing up such nut the plate 29 will be held tightly against the faces of the inner slats of the two sections, and thus hold the two slatted mattress-supporting sections firmly clamped to the cross-bar. It is because of this possibility of having to adapt the mattress-supporting member to automobiles of different width that I provide several of the holes 23 in each end of the transverse bar 19.

When the bed is to be taken down and packed for transportation I utilize the mattress-supporting member as a receptacle within which can be contained the mattress, the bedding and the supporting frames 10, 11, its convertibility into such a receptacle being due to the fact that each of its sections 13 will form rigid oppositely-located front and rear walls while the wings 17 and 18 that are hinged thereto will form the bottom and top walls, respectively, of such casing. In so converting the two sections of this mattress-supporting member into a receptacle they will be combined with two heads 31 that form the end walls of the receptacle. In so combining this sectional mattress-supporting member with the heads 31 the rigidly-united part 13 of each section will be arranged against one of the longitudinal edges of the heads and the hinged portions turned into horizontal position to lie under and over such heads. Against the inner face of each head and along the longitudinal margins thereof are secured two heavy cleats 32, and through alined openings 33 in such cleats is passed a long bolt 34 that also extends between two adjacent slats of each section 13, and thus by means of a nut 35 on the bolt the rigidly-united parts 13 are firmly held connected with the said heads. It will be seen from the drawings that the heads are very considerably wider at their lower ends than at their upper ends, due to the fact that the rear edge of the heads is considerably inclined, whereas the front edge is vertical. This construction of the heads is for the purpose of permitting the receptacle to properly stand on a running-board of the machine without interfering with or rubbing against the side of the body A, which almost invariably has an outward swell, as indicated in Fig. 4. By reason of the inclination given to the rear edges of the heads 31, the receptacle is substantially twice as wide at its bottom as it is at the top, and in the construction shown the bottom width is such as to permit the two inwardly-turned wings 17 to rest on the running-board and form a closure for the bottom, whereas the upper end of the receptacle is only about half such width, and, therefore, the wing 18 of one section lies over the corresponding wing of the other section, as clearly shown in Fig. 4—such overlying of one wing on the other being permitted because the hinges of the wing attached to the front wall section necessarily rise higher than the hinges of the wing attached to the inclined or rear section, all as clearly shown in Fig. 4. The hinged wings 17 at the bottom are held in place by hooks 36 connected to the inner faces of the heads 31 and engaging eyes 37 fastened to the wings. Of course, such wings 17 will remain in proper position when the receptacle is resting on a running board, but it is necessary to lock them by some such means as that shown so that they will not swing away from closing position when the receptacle is being moved onto or off from such running board. The receptacle as a whole is firmly secured to the running board by two rods 38—one at each end of the receptacle—which at their upper ends extend between the slats of the two wings 18 and at the lower ends are hooked into eyes 39 located near the ends of the running board. A nut 40 screwed upon the upper end of the rod will, as will be understood, clamp the receptacle very tightly in place. Preferably, the face of the wing 18 that is uppermost will have secured to it a metal strip 41 with a hole therethrough through which the rod 38 passes, and the nut will be tightened down against that strip. The upper edge of each head 31 is shown as provided with pins 42 which engage in holes 43 in the slats of the lowermost one of the wings 18. It will be seen from what has been said that the heads are very firmly secured in place to the slatted members at both top and bottom of the receptacle, and also by the crosswise bolts 34, and that the overlying one of the wings 18 is held solidly in place by the rods 38 that are provided for securing the receptacle as a whole firmly to a running-board.

By my invention I provide a convertible bed member that provides a very efficient support for a mattress, and which, when the bed is to be dismantled and transported, furnishes also the principal element of a receptacle that can contain all of the other elements of the bed structure and bedding material, and which is of such shape as to adapt it to fit upon and be secured to a running-board without danger of marring or disfiguring the polished body adjacent to it.

What I claim as my invention and desire to secure by Letters Patent, is—

1. A mattress-supporting device comprising in combination a body portion and a wing hingedly connected at one side thereof, said wing being formed of separated slats, and means lying alongside of said slats and separately engaging them for holding them in an upright position.

2. A collapsible bed structure, comprising in combination a body portion having a wing member movably connected thereto at each of its side margins, said wings being each adapted to stand in a substantially vertical position, a bar extending transversely of and below said body member, and means connecting each wing with an end portion of said bar for holding the wings in their substantially vertical position, said bar being adjustable vertically to vary its position relatively to said body portion.

3. A collapsible bed structure, comprising in combination a body portion having a wing member movably connected thereto at each of its side margins, said wings being each adapted to stand in a substantially vertical position, a bar extending transversely of and below said body member, and means connecting each wing with an end portion of said bar for holding the wings in their substantially vertical position, said bar being adjustable vertically to vary its position relatively to said body portion and the connecting means being adjustable longitudinally of the bar.

4. A mattress-supporting device comprising in combination a body portion formed of a plurality of separated slats connected together and a wing member hingedly connected to each of the side slats of said body, a bar extending transversely of and below said slatted body intermediate its ends, and means connected with the end portions of said bar for detachably holding said wings in an upright position.

5. A mattress-supporting device comprising in combination a body portion formed of a plurality of separated slats connected together and a wing member hingedly connected to each of the side slats of said body and standing in an upright position, a rod hooked over the upper edge of each of said turned wings and depending therefrom below the plane of the slatted body, a bar extending transversely of and below said slatted body intermediate the ends of said body, and means for adjustably connecting the end portions of said transverse bar with said depending rods.

6. An automobile-bed mattress-supporting member comprising in combination two sections each formed of a plurality of parts hingedly connected together and adapted to be arranged side by side in mattress-supporting position and with one of the parts of each section in an upright position to prevent movement of a mattress laid thereon, or be turned to form the top, bottom and side walls of a receptacle.

7. An automobile-bed mattress-supporting member comprising two sections each composed of a main or body portion having a wing hingedly connected to each of its sides, one wing of each section being adapted to lie substantially flush with the body section when in mattress-supporting position with the other wing in an upright position, and said sections being convertible into the top, bottom and side walls of a receptacle by turning the wings of each section toward the main or body portion of the other section.

8. An automobile-bed mattress-supporting member comprising two sections each composed of a main or body portion having a wing hingedly connected to each of its sides, one wing of each section being adapted to lie substantially flush with the body section when in mattress-supporting position with the other wing in an upright position, and said sections being convertible into top, bottom and side walls of a receptacle of materially greater width at one end than at the other by turning the wings at the wider end toward each other to lie in substantially the same plane, and turning the said wings at the other end to cause one to lie over the other.

9. An automobile-bed mattress-supporting member comprising a plurality of hinged-together parts adapted in one position to be secured against the edges of two spaced-apart heads to form a receptacle and in another position to lie in a substantially-horizontal position for supporting a mattress.

JET WIMP.